United States Patent
König et al.

(10) Patent No.: US 7,390,114 B2
(45) Date of Patent: Jun. 24, 2008

(54) VEHICLE HEADLIGHT HOUSING CONNECTION STRUCTURE

(75) Inventors: Thomas König, Cullman, AL (US); Thomas Mett, Tauperlitz (DE); Stefan Herrmann, Rehau (DE); Tobias Pfretzschner, Hof (DE); Stefan Lux, Döhlau (DE)

(73) Assignee: Rehau AG & Co., Rehau (DE)

( * ) Notice: Subject to any disclaimer, the term of this patent is extended or adjusted under 35 U.S.C. 154(b) by 132 days.

(21) Appl. No.: 11/015,643

(22) Filed: Dec. 20, 2004

(65) Prior Publication Data

US 2005/0135110 A1 Jun. 23, 2005

(30) Foreign Application Priority Data

Dec. 20, 2003 (DE) ............... 103 60 182

(51) Int. Cl.
*F21V 19/02* (2006.01)
(52) U.S. Cl. .............. 362/523; 362/369; 362/546
(58) Field of Classification Search ........... 362/476, 362/523, 369, 507, 546, 544, 368
See application file for complete search history.

(56) References Cited

U.S. PATENT DOCUMENTS

| | | | | |
|---|---|---|---|---|
| 2,138,082 A * | 11/1938 | Worden | ............ | 362/507 |
| 2,281,643 A * | 5/1942 | Wahlberg | ............ | 362/507 |
| 2,288,429 A * | 6/1942 | Baughn | ............ | 15/250.22 |
| 3,599,269 A * | 8/1971 | Congdon | ............ | 15/250.002 |
| 3,667,082 A * | 6/1972 | Hoyler | ............ | 15/250.02 |
| 4,475,148 A * | 10/1984 | Tomforde | ............ | 362/369 |
| 4,488,206 A * | 12/1984 | Mizusawa | ............ | 362/365 |
| 4,575,782 A * | 3/1986 | Levine et al. | ............ | 362/503 |
| 4,703,398 A * | 10/1987 | Huth et al. | ............ | 362/503 |
| 4,812,955 A * | 3/1989 | Beswick et al. | ............ | 362/549 |
| 4,972,301 A * | 11/1990 | Kasboske | ............ | 362/368 |
| 5,143,331 A | 9/1992 | Robert et al. | | |
| 5,243,502 A * | 9/1993 | Cappuccitti et al. | ............ | 362/549 |
| 5,595,433 A * | 1/1997 | Pokriefka et al. | ............ | 362/503 |
| 5,605,392 A * | 2/1997 | Daumueller et al. | ............ | 362/549 |
| 6,190,030 B1 * | 2/2001 | Chase | ............ | 362/549 |
| 6,471,386 B2 * | 10/2002 | Oh | ............ | 362/549 |
| 6,543,916 B2 * | 4/2003 | Shirai | ............ | 362/523 |
| 6,695,396 B1 * | 2/2004 | Schwab | ............ | 296/203.02 |
| 7,029,154 B2 * | 4/2006 | Arlon et al. | ............ | 362/549 |
| 2002/0051366 A1 * | 5/2002 | Oh | ............ | 362/549 |
| 2005/0135110 A1 * | 6/2005 | Konig et al. | ............ | 362/509 |

FOREIGN PATENT DOCUMENTS

DE 40 20 364 C2 1/1992
DE 41 35 773 A1 5/1993

(Continued)

*Primary Examiner*—Ismael Negron
(74) *Attorney, Agent, or Firm*—Robert Kinberg; Ryan M. Flandro; Venable LLP.

(57) ABSTRACT

A vehicle headlight arrangement includes a headlight housing adapted to enclose a light source, a vehicle body-connecting device connecting the headlight housing to a vehicle body part, and a vehicle-frame connecting device connect which connects the headlight housing to a vehicle frame. The vehicle frame connecting device includes a side-connecting component that allow a movement of the headlight housing relative to the vehicle frame along a single defined direction.

10 Claims, 3 Drawing Sheets

FOREIGN PATENT DOCUMENTS

| | | |
|---|---|---|
| DE | 195 19 653 A1 | 12/1996 |
| DE | 196 32 252 A1 | 1/1998 |
| DE | 197 27 005 C2 | 4/1998 |
| DE | 100 34 526 A1 | 8/2001 |
| DE | 100 48 279 A1 | 4/2002 |
| DE | 100 48 279 C2 | 4/2002 |
| DE | 698 06 445 T2 | 3/2003 |
| EP | 1 232 932 A1 | 8/2002 |
| EP | 1 346 874 A1 | 9/2003 |
| FR | 2 748 708 A | 11/1997 |
| JP | 2002-144951 A | 5/2002 |

* cited by examiner

VEHICLE HEADLIGHT HOUSING CONNECTION STRUCTURE

CROSS-REFERENCE TO RELATED APPLICATION

This application claims the priority of German Patent Application No. 103 60 182.1, filed on Dec. 20, 2003, the disclosure of which is incorporated herein by reference.

BACKGROUND OF THE INVENTION

The invention relates to a vehicle headlight assembly which permits the headlight to move along a single path relative to the vehicle frame.

The invention furthermore relates to a vehicle and an integrated unit which comprises vehicle headlight assembly, above.

A vehicle headlight of this type is known from reference DE 197 27 005 C2. For compensating the differences in the thermal expansion between headlight and adjacent body parts, this reference proposes connecting the headlight form-locking with the vehicle body parts while attaching the headlight with the aid of tongue and groove elements to other vehicle components, so as to permit a movement of the headlight relative to these vehicle components. This results in a thermal compensation, but reduces the directional aiming stability of the beam direction and results in an undesirable increase in the vibration tendency of the headlight.

SUMMARY OF THE INVENTION

It is therefore an object of the present invention to further develop a vehicle headlight of the aforementioned type so as to compensate for the different thermal expansions of the headlight and the surrounding body parts, wherein the stability of the headlight is maintained with respect to beam direction and vibration tendency.

The above and other objects are accomplished by the provision of a vehicle headlight arrangement, comprising: a headlight housing adapted to enclose a light source; a vehicle body-connecting device connecting the headlight housing to a vehicle body part; and a vehicle-frame connecting device connecting the headlight housing to a vehicle frame, wherein the vehicle frame connecting device includes at least one side-connecting component that allows a movement of the headlight housing relative to the vehicle frame along a single defined direction.

In the course of the invention, it was discovered that given the thermal conditions in the area surrounding a vehicle headlight, it is sufficient if relative movement is realized exclusively in one defined direction.

For the required compensation of the different thermal expansions of the headlight as well as the surrounding body parts, this relative movement is sufficient. By presetting exclusively one degree of freedom of the relative movement, the stability of the vehicle-frame connecting device is increased, so that a vibration tendency of the vehicle headlight is suppressed. Since the headlight housing can be connected by means of the connecting device to the body part, clearances predetermined for the headlight opening in the vehicle body can be maintained, even considering the thermal expansion behavior. The relative movement direction predetermined by the inventive design in particular can extend exclusively in beam direction or at a small angle to the beam direction, e.g. <10°. The presetting of the relative movement in beam direction, or essentially in beam direction, prevents an undesirable change in the beam direction of the headlight during the thermal compensation. The body-connecting device can be a component that is separate from the vehicle body part and/or the headlight housing. Alternatively, the body-connecting device can also be configured with components that are integrally linked to the vehicle body part and/or the headlight housing.

An oblong-hole guide of the invention represents a secure vehicle-frame connecting device which simultaneously has a simple structural design.

The same is also true for a groove-and-tongue guide of the invention.

It is furthermore an object of the present invention to modify a vehicle to include a headlight of this type, so as to ensure that a specific clearance is maintained between the headlight housing and the vehicle body in the area where an opening is provided in the body for the headlight, wherein the stability of the headlight in particular must be maintained with respect to beam direction and tendency to vibrate.

This object is solved according to the invention by having the headlight housing connected to the vehicle body by means of the body connecting device in the region of an opening in the body for a vehicle headlight. The headlight housing is connected to the vehicle frame by means of the vehicle-frame connecting device.

The connection according to the invention between the headlight housing and the vehicle body causes the headlight housing to be moved along automatically, for example during a thermally caused relative movement between vehicle body and vehicle frame, such that the installation clearances are maintained. By presetting the relative movement via the vehicle-frame connecting device, the stability of the headlight is simultaneously maintained with respect to beam direction and vibration tendency.

A groove-and-tongue guide embodiment where a component of the tongue-and-tongue guide is an integral part of the vehicle frame has the advantage of a low number of structural components.

Vehicle body-connecting devices including screw-type, groove-type, or latch-type have proven to be particularly suitable for mass production. With latch-type connections, the associated latching elements can furthermore be formed integrally onto the components to be connected.

It is also an object of the present invention to further develop a vehicle headlight as defined for the invention in such a way that the production expenditure for the final assembly of a motor vehicle provided with this headlight is reduced.

This object is solved according to the invention with an integrated unit having the vehicle headlight of the invention and at least one additional component from the following list: a vehicle-frame connecting device, a body connecting device, a body part in particular a fender, an energy absorbing component for cushioning the impact between a vehicle, equipped with this component, and another object, a headlight cleaning unit, and a parking aid.

An integrated unit such as that described above permits a faster final assembly of the motor vehicle.

The above and other objects are accomplished by the invention by provision of a vehicle headlight arrangement which includes a headlight housing adapted to enclose a light source, a vehicle body-connecting device connecting the headlight housing to a vehicle body part, and a vehicle-frame connecting device connecting the headlight housing to a vehicle frame. The vehicle frame connecting device includes side-connecting components that allow a movement to the vehicle frame along a single defined direction.

BRIEF DESCRIPTION OF THE DRAWINGS

Exemplary embodiments of the invention are explained in further detail in the following with the aid of the accompanying drawings.

DETAILED DESCRIPTION OF THE INVENTION

Figure 1:
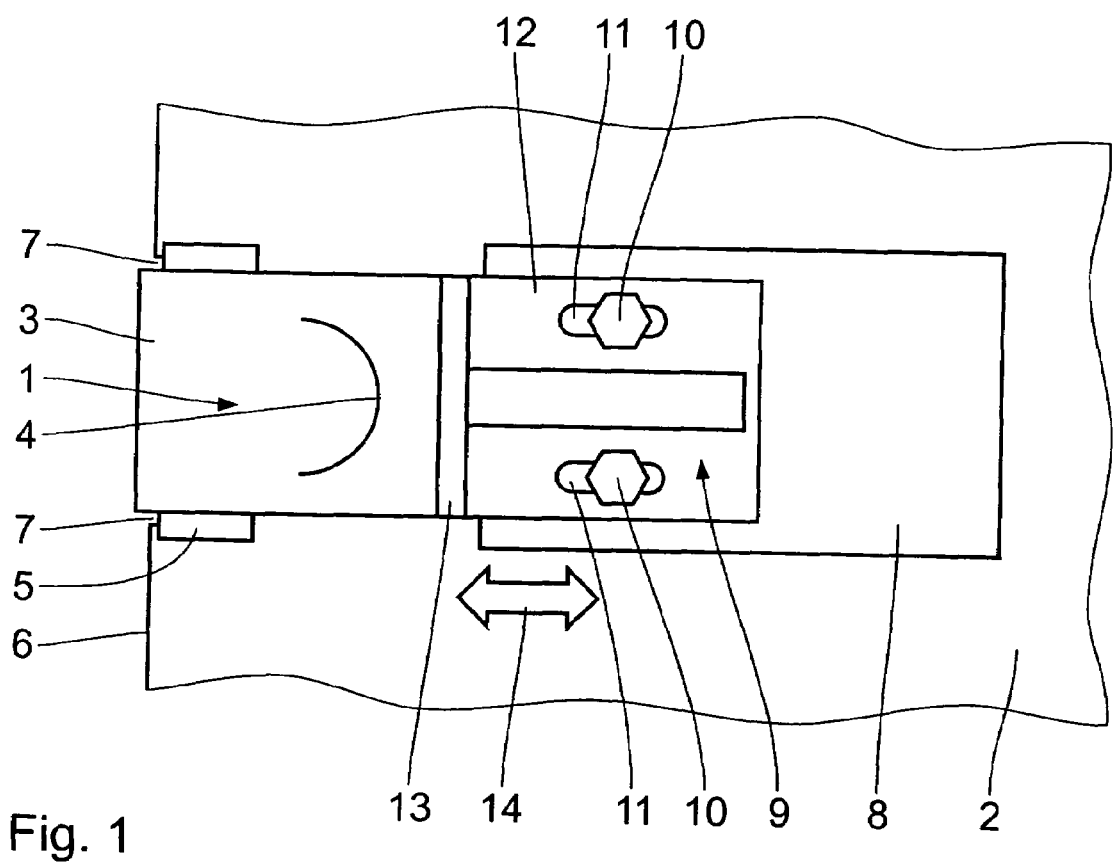
FIG. 1 is a schematic representation of a vehicle detail, showing a vehicle headlight connected to the vehicle.

The detail 2 of a motor vehicle shown in FIG. 1 schematically depicts a first embodiment of a vehicle headlight 1. A headlight housing 3 is provided with a light source, of which only one reflector 4 is shown schematically herein. The headlight housing 3 is connected by means of a rigid vehicle-body connecting device 5 to a vehicle body part 6. This connection allows a gap 7 with constant gap width to be maintained between the headlight housing 3 and the surrounding section of the body part 6.

The headlight housing 3 is connected to a frame component 8 of an otherwise not shown vehicle frame by means of a vehicle-frame connecting device 9, embodied as oblong-hole guide. For this, the frame component 8 is provided with two internal threads, positioned one above the other in FIG. 1, into which screws 10 are screwed. The screws extend through two oblong holes 11 of a connecting member 12, also positioned one above the other in FIG. 1, wherein the connecting member is connected rigidly to the headlight housing 3 via an intermediate piece 13. The internal threads in the frame component 8, the screws 10, the oblong holes 11, the connecting member 12, as well as the intermediate piece 13 jointly form the vehicle-frame connecting device 9. The orientation of the oblong holes 11 and the screw 10 tightening moment are selected such that a movement of the vehicle headlight 1 relative to the frame component 8 is possible along the beam direction of the vehicle headlight 1, wherein this mobility is indicated in FIG. 1 with a double arrow 14.

Figure 2:
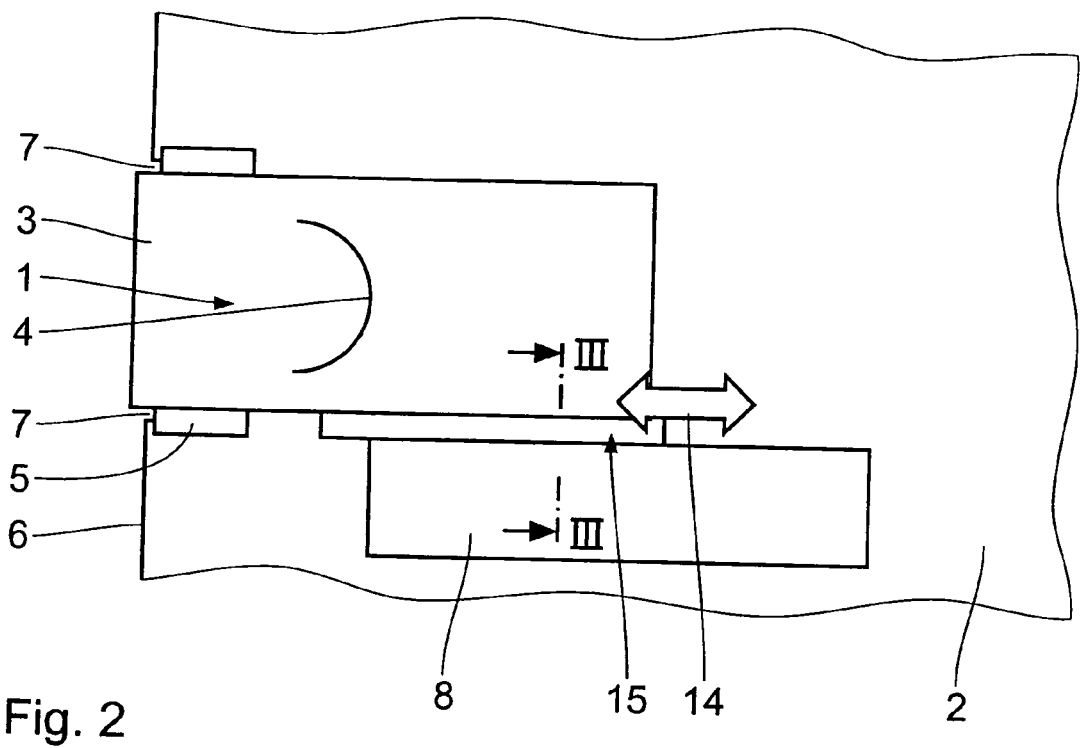
FIG. 2 is a representation similar to the one shown in FIG. 1 of a vehicle headlight connected to a vehicle.
Figure 3:
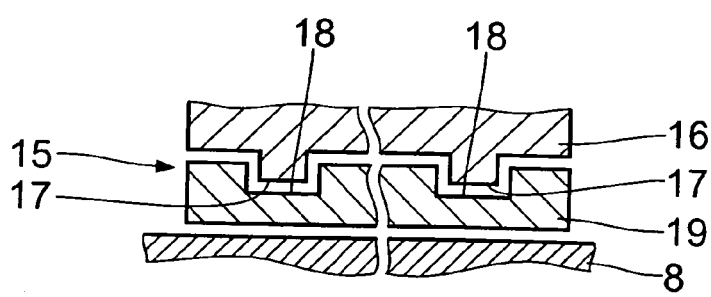
FIG. 3 is a sectional view along the line III-III, shown in FIG. 2.

FIGS. 2 and 3 show a different variant of the embodiment of the movable vehicle headlight. Components corresponding to those described in the above for FIG. 1 are given the same reference numbers and will not be explained again.

With the embodiment shown in FIGS. 2 and 3, a vehicle-frame connecting device 15, embodied as tongue and groove guide, is disposed between the frame component 8 and the headlight housing 3. A tongue component 16 of the vehicle-frame connecting device 15 is integrally formed onto the headlight housing 3, as shown in FIG. 3. The tongue component 16 is provided with two spaced-apart ridges 17 which extend in relative movement direction 14. Complementing these ridges are two grooves 18 in a groove component 19 for the vehicle-frame connecting device 15. The groove component 19 is connected rigidly with the separate frame component 8, in a manner not shown herein. The vehicle-frame connecting device 15 is embodied in such a way that a movement of the vehicle headlight 1 relative to the frame component 8 is possible only in the direction of double arrow 14. For the embodiment shown in FIGS. 2 and 3, this is realized in that the headlight housing 3 is held in place on the groove component 19 of the vehicle-frame connecting device 15 by the force of the weight of the tongue component 16, thus preventing a different type of relative movement. Alternatively, a tongue and groove guide of the type used for the vehicle-frame connecting device 15 can also be embodied with a dovetail guide, so that the weight force is not important.

Figure 4:
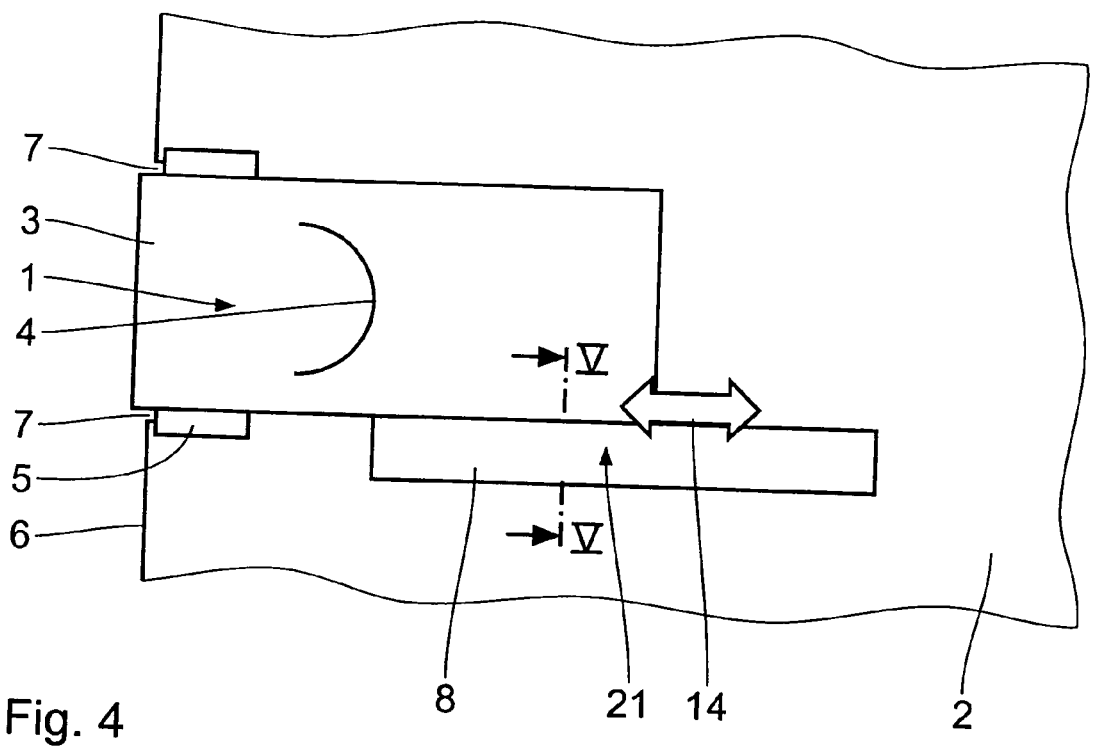
FIG. 4 is a representation similar to the one shown in FIG. 1 of a vehicle with an additional vehicle headlight.
Figure 5:
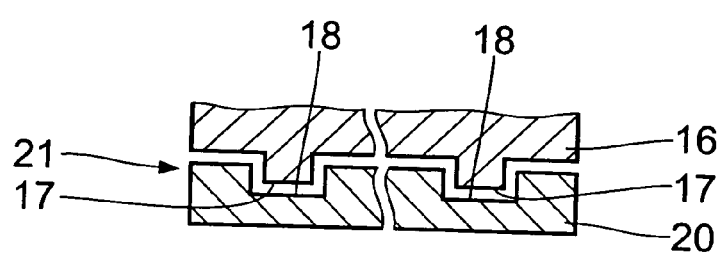
FIG. 5 is a sectional view along the line V-V shown in FIG. 4.

FIGS. 4 and 5 show a different variant of the embodiment of a movable vehicle headlight. Components described in the above in connection with FIGS. 1 and 3 are given the same reference numbers and will not be explained again in further detail. In place of a separate groove component, which is attached to the frame component, the groove component 20 for the embodiment according to FIGS. 4 and 5 is formed integrally onto the frame component 8. The vehicle-frame connecting device 21, realized in this way, corresponds in all other aspects to the vehicle-frame connecting device 15.

The body-connecting device 5 can be a screw-type, groove-type, or latch-type connection, wherein the use of a layer of adhesive for the connection is also conceivable.

The vehicle headlights described in connection with FIGS. 1 to 5 can form a part of an integrated unit that also comprises the following additional components: the vehicle-frame connecting devices 9, 15, 21; the body connecting element 5; the body part 6 which may be a fender; an energy absorbing element for cushioning an impact between a vehicle provided with this element and a different object; a headlight cleaning unit; and a parking aid.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A vehicle headlight arrangement, comprising:
a headlight housing adapted to enclose a light source;
a rigid vehicle body-connecting device connecting the headlight housing to a vehicle body part; and
a vehicle-frame connecting device moveably connecting the headlight housing to a vehicle frame, wherein the vehicle-frame connecting device includes at least one side-connecting component that allows a movement of the headlight housing relative to the vehicle frame along a single defined direction in response to thermal changes in the area surrounding the vehicle headlight arrangement, whereby when the vehicle headlight arrangement is subject to thermal changes the headlight housing moves relative to the vehicle frame along the single defined direction such that the stability of the headlight housing is maintained with respect to beam direction and vibration tendency.

2. The vehicle headlight arrangement according to claim 1, wherein the at least one side-connecting component includes an oblong hole guide, and a second component attached on the vehicle frame, for guiding the headlight housing in the single defined direction, wherein the oblong hole guide is connected to the second component.

3. The vehicle headlight arrangement according to claim 1, wherein the at least one side-connecting component includes a tongue and groove guide having a first and a second component, the second component of the tongue and groove guide attached to the vehicle frame side in a manner to permit the movement of the headlight housing in the single defined direction, wherein the first component of the tongue and groove guide is connected to the second component of the tongue and groove guide.

4. An integrated unit as part of a motor vehicle, comprising a vehicle headlight arrangement according to claim 1 and at least one energy absorbing component for cushioning the impact between a vehicle, equipped with this component, and another object.

5. The integrated unit of claim 4, wherein the at least one side-connecting component includes an oblong hole guide, and a second component attached on the vehicle frame, for guiding the headlight housing in the single defined direction, wherein the oblong hole guide is connected to the second component.

6. The integrated unit of claim 4, wherein the at least one side-connecting component includes a tongue and groove guide having a first and a second component, the second component of the tongue and groove guide attached to the vehicle frame side to permit the movement of the headlight housing in the single defined direction, wherein the first component of the tongue and groove guide is connected to the second component of the tongue and groove guide.

7. A combination comprising a vehicle including a frame, a body having an opening for a vehicle headlight and the vehicle headlight arrangement according to claim 1, wherein the headlight housing is connected in the region of the opening in the body to the body itself by the body connecting device; and the headlight housing is connected to the vehicle frame by the vehicle-frame connecting device.

8. The vehicle according to claim 7, wherein the vehicle-frame connecting device is a groove and tongue guide having two components and wherein the vehicle frame includes one of the two components of the groove and tongue guide integral therewith.

9. The vehicle of claim 7, wherein the at least one side-connecting component includes an oblong hole guide, and a second component attached on the vehicle frame, for guiding the headlight housing in the single defined direction, wherein the oblong hole guide is connected to the second component.

10. The vehicle of claim 7, wherein the at least one side-connecting component includes a tongue and groove guide having a first and a second component, the second component of the tongue and groove guide attached to the vehicle frame side to permit the movement of the headlight housing in the single defined direction, wherein the first component of the tongue and groove guide is connected to the second component of the tongue and groove guide.

* * * * *